United States Patent
Jarasson

(10) Patent No.: US 9,963,119 B2
(45) Date of Patent: May 8, 2018

(54) DEVICE FOR TRANSPORTING AND HEATING A LIQUID FOR A VEHICLE WINDOW WIPING SYSTEM

(71) Applicant: Valeo Systèmes d'Essuyage, La Verriere (FR)

(72) Inventor: Jean-Michel Jarasson, Le Mesnil St Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 615 days.

(21) Appl. No.: 13/719,516

(22) Filed: Dec. 19, 2012

(65) Prior Publication Data

US 2013/0156410 A1    Jun. 20, 2013

(30) Foreign Application Priority Data

Dec. 19, 2011    (FR) ...................................... 11 61875

(51) Int. Cl.
| | |
|---|---|
| *F24H 1/18* | (2006.01) |
| *H05B 3/40* | (2006.01) |
| *H05B 3/78* | (2006.01) |
| *F24H 1/10* | (2006.01) |
| *B60L 1/02* | (2006.01) |
| *B60S 1/48* | (2006.01) |
| *B60S 1/50* | (2006.01) |

(Continued)

(52) U.S. Cl.
CPC ................. *B60S 1/488* (2013.01); *B60S 1/50* (2013.01); *F24H 1/12* (2013.01); *B60S 1/524* (2013.01)

(58) Field of Classification Search
CPC .. B60S 1/488; B60S 1/50; B60S 1/524; B60S 1/026; B60S 1/04; B60S 1/38; B60S 1/522; F24H 1/12; F24H 1/009; F24H 1/10; H05B 3/40; H05B 3/56; H05B 3/58; H05B 3/78; B60L 1/02
USPC ......... 219/202–203; 392/441–442, 449, 398, 392/401, 472, 465, 485–489, 503
See application file for complete search history.

(56) References Cited

U.S. PATENT DOCUMENTS

| | | | | |
|---|---|---|---|---|
| 3,888,412 A | * | 6/1975 | Lindo ..................... | B60S 1/487 137/599.14 |
| 4,038,519 A | * | 7/1977 | Foucras ................ | A61M 1/369 138/133 |
| 4,920,602 A | | 5/1990 | Kuehbauch | |

(Continued)

FOREIGN PATENT DOCUMENTS

| | | | | |
|---|---|---|---|---|
| DE | 4402372 A1 | * | 8/1995 | ............. B08B 3/026 |
| JP | 47-009775 B | | 3/1972 | |

OTHER PUBLICATIONS

German-English translation of DE 4402372.*

(Continued)

*Primary Examiner* — Michael G Hoang
(74) *Attorney, Agent, or Firm* — Osha Liang LLP

(57) ABSTRACT

A device for transporting and heating a liquid may be installed between a means for circulating the liquid and a wiper brush constituting a wiping system of a vehicle window. The device may include a wall that delimits at least one liquid circulation duct and in which may be embedded a heating element. The heating element may include at least one first electrically conductive strand and one second electrically conductive strand. A spacing means that extends at least between said strands may be provided within the wall.

17 Claims, 3 Drawing Sheets

(51) Int. Cl.
  *F24H 1/12* (2006.01)
  *B60S 1/52* (2006.01)

(56) References Cited

U.S. PATENT DOCUMENTS 5,454,061 A * 9/1995 Carlson .................. B29C 66/49
                                                        392/472
6,317,559 B1 * 11/2001 Kim ...................... F24H 9/1818
                                                        392/398

OTHER PUBLICATIONS

"Properties of PTFE and Some Other Insulating Materials".*
Wayback Machine.*
First Office Action issued in corresponding Chinese Application No. 201210599366.6, dated Nov. 4, 2015 (19 pages).
Notification of Reason for Rejection issued in corresponding Japanese Patent Application No. 2012-277159, dated Nov. 29, 2016 (4 pages).

* cited by examiner

DEVICE FOR TRANSPORTING AND HEATING A LIQUID FOR A VEHICLE WINDOW WIPING SYSTEM

BACKGROUND

The technical sector of the present invention is that of the systems for supplying and/or distributing screen-wash liquid for motor vehicles. Such a system accompanies a vehicle window wiping installation. More particularly, the invention targets a device for transporting and heating the liquid conveyed between a tank and a spraying system.

Motor vehicles are routinely equipped with wiping installations and washing systems to ensure the wiping and washing of the windscreen, and thus prevent the driver's vision of his or her environment being disrupted. These wiping installations comprise arms describing an angular reciprocal movement at the end of which are installed elongate brushes, which in turn bear scraper blades made of an elastic material. These blades rub against the windscreen and dispel the water by bringing it outside the field of vision of the driver. The brush is attached to the rotating arm of the windscreen wiper by an assembly consisting of a mechanical connector and an adapter. The connector is a part which is fixed directly onto the structure of the brush, the adapter being an intermediate part which makes it possible to fasten the connector, and consequently the brush, onto the arm of the windscreen wiper. These two parts are linked to one another by a transversal axis which allows their relative rotation.

The washing systems comprise a device for feeding a screen-wash liquid which is routed from a tank located in the vehicle and which is sprayed towards the windscreen by nozzles generally located on the bonnet, on the windscreen bay grating or on the windscreen wiper itself for a better distribution of the liquid. In the case of nozzles placed on the brushes, the screen-wash liquid is routed, before being distributed between them, by pipelines which are fixed onto the arms of the windscreen wiper and which are connected to a distribution system of the brush at the connector. The connector thus comprises orifices suitable for receiving, by a leak-tight link, the endpieces of said pipelines.

When the temperature of the screen-wash liquid is too low, for example below 5° C., the screen-wash liquid is heated to de-ice it or keep it de-iced. For this, a transport duct reheats the screen-wash liquid taken from a tank by a pump at the time when the screen wash control is actuated, generally by the control lever placed alongside the steering wheel and controlling, among other things, the actuation of the windscreen wipers.

The heating of the liquid in the transport duct is ensured by a heating element which runs next to the duct. It has also been proposed to incorporate this heating element inside the duct but such an incorporation poses problems of positioning of the heating element relative to the duct in which the liquid circulates, which is reflected in a degradation of the liquid heating function and a reduction of its efficiency over the length of the heating element. Furthermore, the arrangement of the heating element is not managed satisfactorily since overheating has been detected in certain areas of the heating element. It will be understood from the above that liquid transport and heating device as described above presents drawbacks.

SUMMARY OF DISCLOSURE

The aim of the present invention is therefore to resolve the drawbacks described above mainly by providing a device for transporting and heating a liquid, constituting a system for supplying and/or distributing screen-wash liquid, capable of effectively distributing the calories generated by heating elements by separating the latter so that the distribution occurs all around each heating element.

The subject of the invention is therefore a device for transporting and heating a liquid intended to be installed between a means for circulating the liquid and a wiper brush constituting a wiping system of a vehicle window, comprising a wall delimiting at least one liquid circulation duct and in which is embedded a heating element comprising at least one first electrically conductive strand and one second electrically conductive strand, said device comprising a spacing means common to the first strand and to the second strand and which extends at least between said strands.

According to a first feature of the invention, the spacing means defines a determined distance between the strands in order to promote a dissipation of calories generated by the strands.

According to a variant of the invention, the device comprises a first duct separated from a second duct by the wall, the heating element extending between the first duct and the second duct. This area between the ducts extends as the space included between a first axis which is tangential to the first duct and the second duct and a second axis which is tangential to the first duct and to the second duct at points diametrically opposite the points of tangency of the first axis, the first axis and the second axis being parallel to a straight line which passes through a centre of the first and of the second duct.

According to another feature of the invention, the first duct and the second duct each have a duct centre through which passes a first straight line, the first strand and the second strand each have a strand centre through which passes a second straight line, the second straight line being at right angles to the first straight line. It will thus be understood that the first straight line and the second straight line form a cross. Such a design makes it possible to reduce a width of the transport and heating device, this width corresponding to a direction parallel to the first straight line.

According to another variant of the invention, the first duct and the second duct each have a duct centre through which passes a first straight line, the first strand and the second strand each have a strand centre through which passes a second straight line, the second straight line being parallel to the first straight line. Such a solution makes it possible to form a first duct-first strand pair which can be separated from a second second duct-second strand pair.

In such a variant, the second straight line may be merged with the first straight line. Thus, the first duct, the first strand, the second strand and the second duct are aligned on one and the same axis.

It will be noted that an internal face of a duct comprises a first portion of a form different from a second portion of said internal face, the first portion being arranged to maximize a transfer of calories between the heating element and the liquid which can circulate in the duct. In other words, the form of the duct, seen in cross section, is organized in relation to the strands so as to minimize the distance which separates these strands from the first and second ducts.

In such a variant of the invention, the first portion is rectilinear whereas the second portion is curved. The section of the internal face of the duct thus forms a "D", where the straight portion is placed directly facing the heating element.

The rectilinear first portion extends along a third straight line parallel to a second straight line passing through a centre of the first strand and a centre of the second strand.

According to another variant of the invention, the first portion is curved in a convex manner whereas the second portion is curved in a concave manner. Thus, the first portion follows the circular contour of a strand, which enables the fluid to exchange over an angular segment at least equal to 60°, the origin of the segment being the centre of the strand concerned.

Advantageously, the wall of the duct which extends between a strand and the first portion of the internal face has a constant thickness. The transfer of the calories to the liquid is made uniform over a significant angular segment of the strand.

Also advantageously, the device comprises at least two ducts and at least two heating elements each consisting of two strands spaced apart from one another by the spacing means, in which is provided a divisible area of the wall arranged between the two heating elements. Such a divisible area is an area arranged to facilitate a separation of a first pair consisting of a first duct and of a first heating element with a second pair consisting of a second duct and a second heating element.

The divisible area is formed by a thinned portion of the wall, located between the two heating elements.

Preferably, the spacing means is in contact with the first strand and the second strand, which avoids any slippage of the strands against the spacing means and therefore any damage to said strands.

The main advantage according to the invention lies in the improved effectiveness of the heating function of a screen-wash liquid supply system.

Another advantage lies in the possibility of reducing the electrical consumption required to operate this heating function.

Other features, details and advantages of the invention will become more clearly apparent on reading the following description given as an indication in relation to the drawings in which:

DETAILED DESCRIPTION

Figure 1:
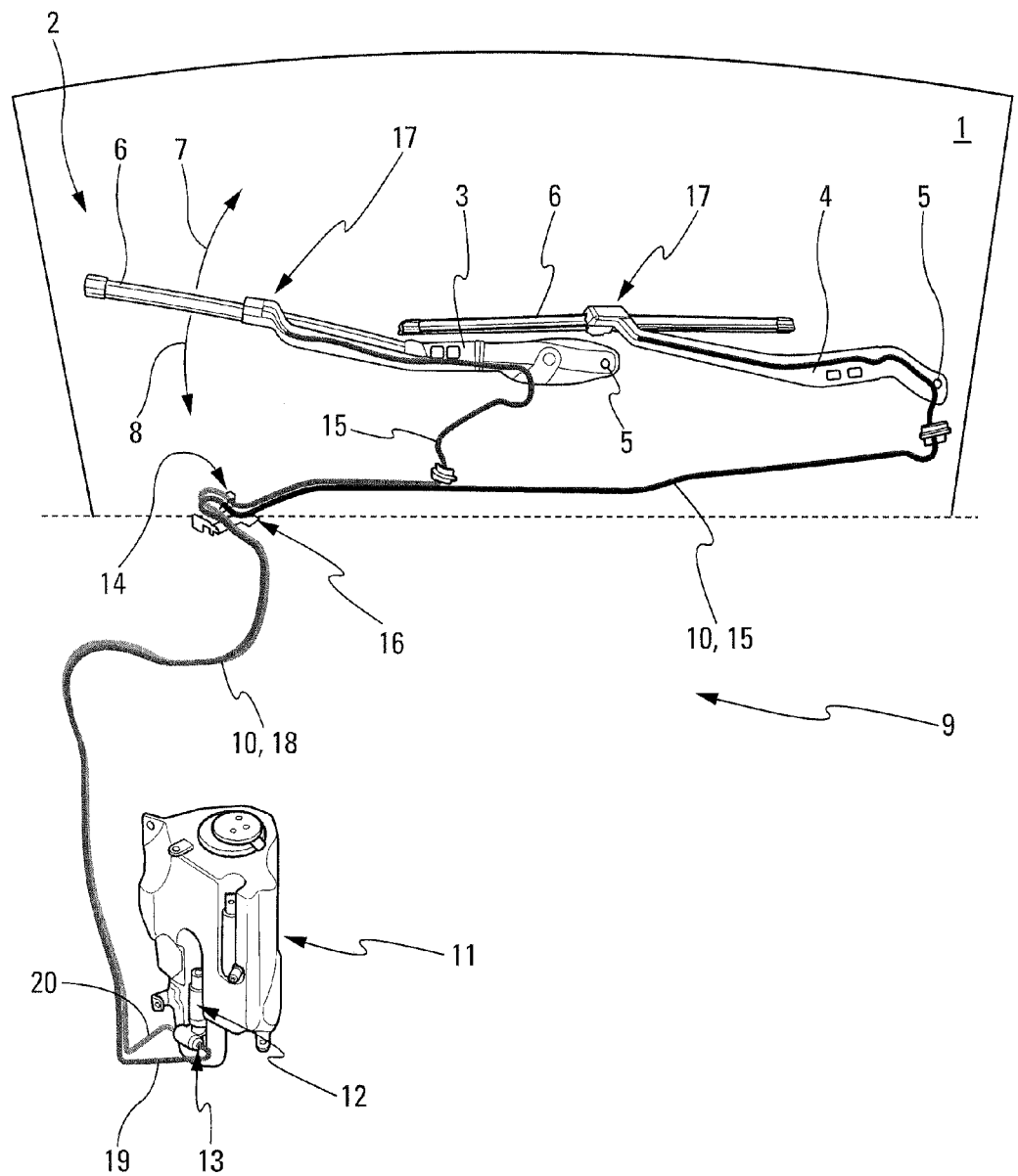
FIG. 1 is a general view of a system for supplying and/or distributing liquid and a wiping installation, comprising at least one liquid transport and heating device according to the invention.

FIG. 1 is a view illustrating a motor vehicle windscreen 1 intended to be wiped by a wiping installation 2. The latter comprises a first arm 3 and a second arm 4, each linked, for example, to a rotation axis 5. These two arms are displaced on the windscreen 1 by a combined reciprocal movement or by an opposing reciprocal movement.

At the end opposite to the axis 5 relative to the first arm 3 and to the second arm 4, there is a wiping brush 6, the function of which is to scrape the windscreen push back the water present thereon into areas of the windscreen which do not hamper visibility. These wiping brushes 6 are linked to each arm by a removable connector allowing for a replacement of the wiping brush when the latter is worn.

The wiping brushes each comprise, for example, two distributors for spraying a liquid, notably a screen-wash liquid. These distributors extend longitudinally in a same axis as a longitudinal axis of the wiping brush 6. These distributors are arranged on either side of the wiping brush, on its longitudinal axis, so as to spray the screen-wash liquid in front of the brush when the latter is displaced in a first direction of displacement illustrated by the arrow 7 or in a second direction of displacement illustrated by the arrow 8.

This FIG. 1 also shows the presence of a system for supplying and/or distributing 9 screen-wash liquid with which the vehicle is equipped. For the distributors to spray this liquid, it is necessary to have a stock of screen-wash liquid, a means for transporting this liquid between the stock and the distributors and a means for circulating this liquid from this stock to the distributors.

This system for supplying and/or distributing 9 comprises, notably:

- a liquid retention tank 11,
- a means for circulating 12 the liquid in the supply and/or distribution system, this means can notably be a pump,
- at least one hydraulic coupling 13 intended to link the pump to a liquid transport and heating device 10,
- a coupling device 14 installed between the liquid transport and heating device 10 linked to the pump and another liquid transport and heating device 10 linked to the wiping brush 6,
- a support 16 suitable for mechanically assembling the coupling device 14 and one or more electrical connectors which electrically supply the heating elements embedded in the liquid transport and heating devices 10 mentioned above and heating elements incorporated in the wiping brush,
- a hydraulic connector 17 installed between at least the liquid transport and heating device 10 and the wiping brush 6.

The liquid transport heating device 10 situated between the coupling device 14 and the wiping brush 6 will hereinafter be called first liquid transport and heating device 15, being largely situated outside the vehicle and along at least one wiping arm.

The liquid transport and heating device 10 situated between the circulation means 12 and the coupling device 14, for its part, will be called second liquid transport and heating device 18, the latter extending more particularly within a compartment of the vehicle, notably the engine compartment.

The features that apply to one or other of the liquid transport and heating devices, the description will employ the general term liquid transport and heating device referenced 10.

The invention covers the case where the structure of the first liquid transport and heating device 15 and that of the second liquid transport and heating device 18 are identical, but it also covers the case where the first liquid transport and heating device 15 is produced according to one variant of the invention whereas the second liquid transport and heating device 18 is produced according to another variant of the invention, different from that implemented for the first liquid transport and heating device 15.

For these two liquid transport and heating devices, it is a tube, for example, flexible which delimits at least one liquid circulation duct. The material forming such a tube may be, for example, an EPDM, an elastomer or a rubber.

In the example of FIG. 1, the first and second liquid transport and heating devices each comprise two ducts 19 and 20 inside which the liquid can circulate. This liquid transport and heating device 10 also comprises a heating element (not visible in FIG. 1) which runs along the ducts by being embedded in the material forming the liquid transport and heating device. Such a heating element is a resistive element, which takes the form of a first electrically conductive strand and a second electrically conductive strand which, when an electric current passes through it, releases calories.

It will therefore be understood that this heating element forms a source of heat from which the liquid transport and heating device 10 draws energy and dissipates it all around the space, that is to say in the ducts, that can contain the liquid.

Figure 2:
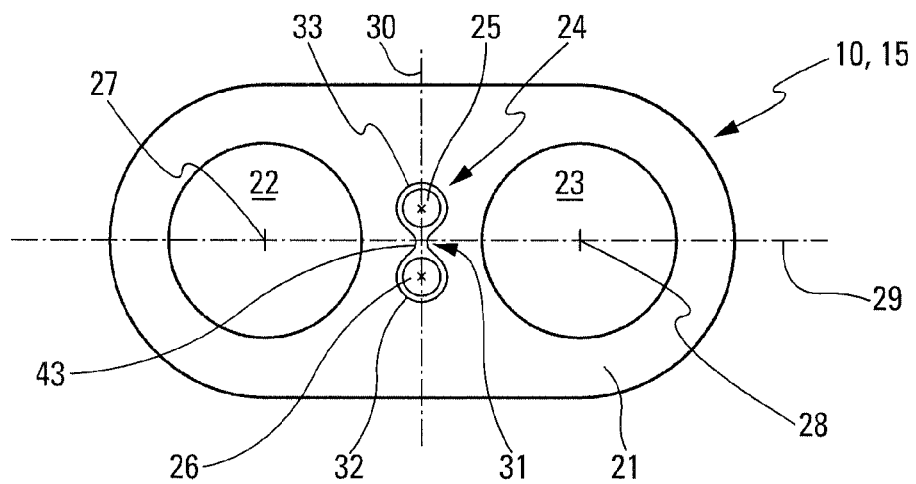
FIG. 2 is a cross-sectional view of the transport and heating device according to the invention.

FIG. 2 shows the detail of the liquid transport and heating device 10. The latter comprises a wall 21 which delimits a first duct 22 from a second duct 23. This wall 21 also delimits this first duct 22 and this second duct 23 relative to the environment surrounding the liquid transport and heating device 10. In other words, the ducts are formed in the wall in a seal-tight manner to transport the screen-wash liquid.

According to the example of FIG. 2, it will be noted that the section of the first duct 22 and of the second duct 23 is circular, the internal diameter of these ducts being, for example, between 3 mm and 5 mm, a value of 3.5 mm or of 3.9 mm being particularly appropriate for observing the constraints of bulk that a motor vehicle wiping system imposes. The dimensional values given above can obviously be transposed to any of the variants described in the present description.

The heating element 24 comprises a first electrically conductive strand 25 which juxtaposes a second electrically conductive strand 26. It is, for example, a cable made of copper or of aluminium alloy dimensioned to release calories when a current of voltage between 9 and 16 volts and of intensity between 1.5 and 10 amperes passes through it. This cable can advantageously be covered by a sleeve dedicated to each strand, this sleeve being distinct from the spacing means as detailed below.

The heating element 24 comprises two strands 25 and 26 which are in contact with one another at one or other of the ends of the liquid transport and heating device, notably forming a loop. In other words, the first strand 25 and the second strand 26 form one and the same electrical wire that has been split inside the liquid transport and heating device 10.

This heating element 24 is embedded in the wall 21. The term "embedded" will be understood, for example, to mean the fact that the material forming the wall 21 completely surrounds the heating element 24, all of the periphery thereof being in contact with the wall.

The location of this heating element 24 relative to the first and the second ducts 22, 23 is particular. This heating element 24 is arranged generally between the first duct 22 and the second duct 23, that is to say between a first axis passing through a centre 27 of the first duct 22 and a second axis passing through a centre 28 of the second duct 23.

According to a variant, a first straight line 29 passing through the centre 27 of the first duct 22 and through the centre 28 of the second duct 23 is at right angles to a second straight line 30 passing through a centre of the first strand 25 and through a centre of the second strand 26. There is thus a guarantee that the bulk measured on the first straight line 29 is optimized. Although the right-angular arrangement presents an advantage as to the balance of the distribution of the calories between the first duct and the second duct, the invention also covers the case where the second straight line 30 forms an angle of between 0 and 90° relative to the first straight line 29.

The liquid transport and heating device 10 also comprises a spacing means 31. The latter is common to the first strand 25 and to the second strand 26 in as much as it is arranged between these two strands and in contact therewith. Such a definition is understood also for a spacing means which surrounds all the periphery of each strand, thus forming a sheath all around the strands or all around the sleeves protecting the strands when the latter are provided therewith. In such a case, the distal portions 32 and 33 of the spacing means 31 which surround the strands 25 and 26 and the central portion 43 of the spacing means 31 form a single and unique part.

This spacing means 31 extends between the strands. It is thus installed between the centre of the first strand 25 and the centre of the second strand 26, and aligned on the second straight line 30. This spacing means 31 generates a gap, otherwise called distance, between the first strand 25 and the second strand 26, which enables each of the strands to dissipate calories over a significant angular segment. Any hot spots are thus avoided since the spacing means 31 imposes a determined distance so as to minimize the temperature rise in the axis of the second straight line 30 while maximizing the dissipation of the calories in favour of the first duct 22 and/or the second duct 23.

According to an exemplary embodiment, the spacing means is made of a flexible material, a silicone or a polytetrafluoroethylene (PTFE) which are particularly well suited to this application because of their useful low adhesion during the method for extruding the liquid transport and heating device 10.

Figure 3:
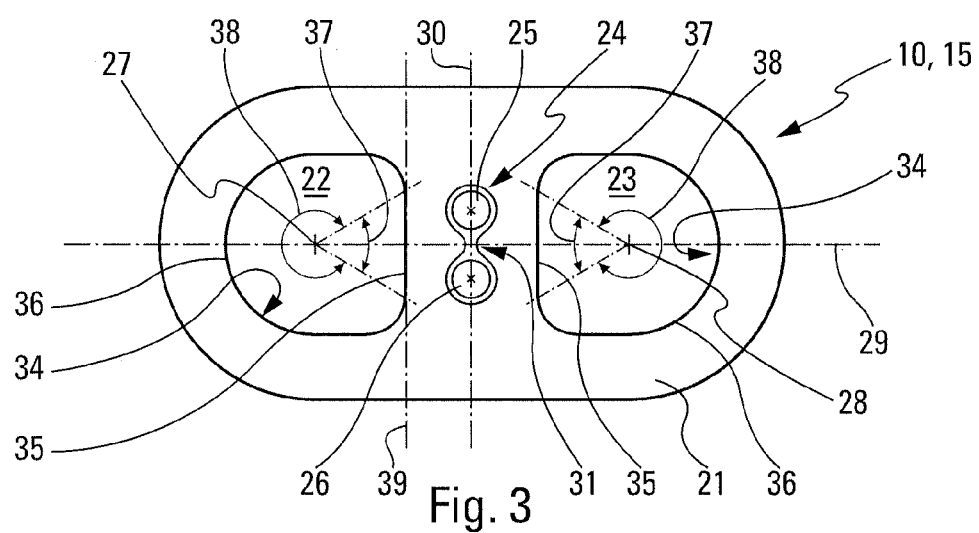
FIG. 3 is a cross-sectional view of a first variant of the transport and heating device according to the invention.

FIG. 3 shows a first variant of the invention. There follows below a description of the technical difference with the liquid transport and heating device according to FIG. 2, and reference will be made to the latter to know how identical elements are implemented.

The difference lies in the profile of the first duct 22 and of the second duct 23. An internal face 34 of one and/or the other of the ducts comprises a first portion 35 of a form different from a second portion 36 of said internal face. The first portion 35 thus extends over an angular segment 37 of between 45° and 90°, the origin of such a segment being the centre 27 or 28 of the duct concerned. The second portion 36 extends over an angular segment 38 complementing the first angular segment 37.

It is important that the first portion 35 be arranged to maximize a transfer of calories between the heating element 24 and the liquid which can circulate in the first duct 22 and/or in the second duct 23. Such a maximization is obtained by reducing the thickness of the wall 21 situated between the heating element and the duct concerned.

Since the spacing means tends to increase the height of the heating element 24, measured on the second straight line 30, the profile of the duct is adapted so that the first portion 35 is facing the heating element 24 over a height at least equal to the height of the heating element, the thickness of the wall 21 being constant over a height at least greater than the diameter of a strand of the heating element. This wall thickness 21 increases with the distance which separates the internal wall at the level of the first portion 35 with a straight line segment which is tangential to the first strand 25 and the second strand 26, on one and the same side.

According to an exemplary embodiment, the section of these ducts forms, generally, a "D". In other words, the first portion 35 is rectilinear whereas the second portion 36 is curved, and notably comprises a series of curves of different radii. In such a case, the rectilinear first portion 35 extends along a third straight line 39 parallel to the second straight line 30 which passes through the centre of the first strand 25 and the centre of the second strand 26.

Obviously, the first portion 35 is adjacent to the heating element, the latter thus being inserted between the second portion 36 and the heating element on the first straight line 29.

Figure 4:
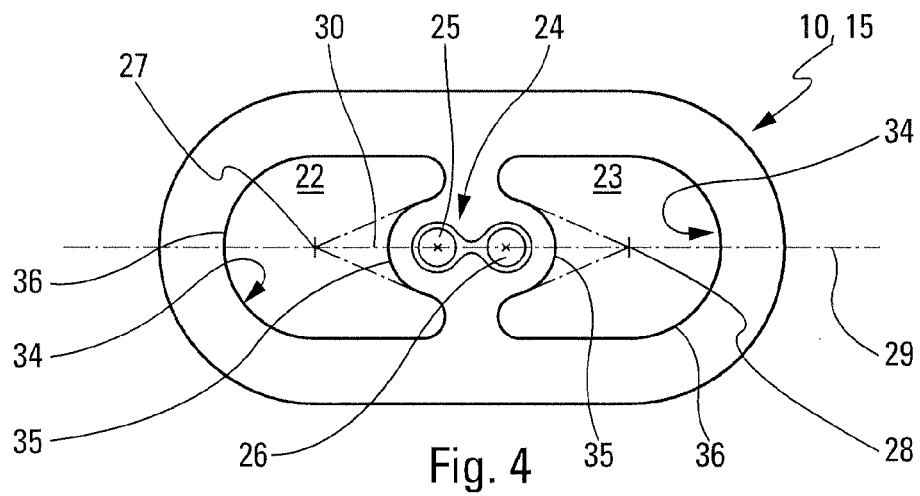
FIG. 4 is a cross-sectional view of a second variant of the transport and heating device according to the invention.

FIG. 4 shows a second variant of the invention. There follows below a description of the technical differences with the liquid transport and heating device according to FIG. 2 or 3, and reference will be made to the latter to know how identical elements are implemented.

The differences lie, on the one hand, in the form of the section of the first duct 22 and/or of the second duct 23, and, on the other hand, in the orientation of the heating element 24 relative to the first and second ducts 22 and 23.

As for the preceding variants, the first duct 22 and the second duct 23 each have a duct centre, respectively referenced 27 and 28, through which passes the first straight line 29. On the other hand, the heating element 24 is arranged so that the second straight line 30 which passes through the centre of the first strand 25 and through the centre of the second strand 26 is parallel to the first straight line.

In the example of FIG. 4, the second straight line 30 is merged with the first straight line 29, but the invention also covers the case where the heating element is laterally offset, so that a non-zero distance separates the first straight line 29 from the second straight line 30.

With respect to the form of the ducts, it will be noted that the first portion 35 of the ducts 22 or 23 follows the curved profile of the strand 25 or 26 concerned. This first portion 35 then has a curved section which, seen from the centre 27 of the first duct 22 or from the centre 28 of the second duct, presents a convex surface. Seen from the same point, the second portion 36 follows a concave profile. It is notably formed by a combination of curved portions and of rectilinear portions so as to form the volume followed by the liquid when the latter circulates in the first duct 22 and in the second duct 23.

In the configuration described above, it is advantageous for the wall 21 of the duct which extends between a strand 25 or 26, and more particularly the spacing means 31, and the first portion 35 forming a portion of the internal wall 34, to have a constant thickness. The distance which separates the strand from the liquid circulating in the duct is thus reduced, which makes it possible to ensure that it is heated more effectively.

Figure 5:
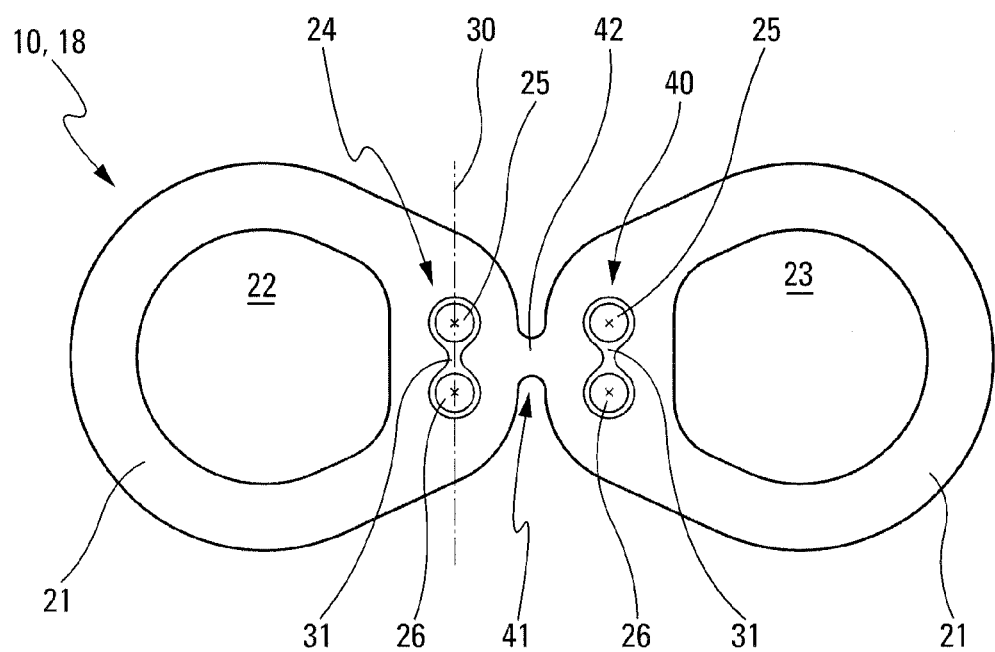
FIG. 5 is a cross-sectional view of a third variant of the transport and heating device according to the invention.

Although applicable to the variants of FIGS. 2 to 4, the variant of FIG. 5 more particularly addresses the second transport and heating device referenced 18 in FIG. 1, because the latter is coupled to a liquid circulation means, notably a pump.

Such a pump has two outputs arranged on either side of a body of the pump. These outputs are at a distance from one another and do not allow a transport and heating device as described above to be directly coupled. It is thus necessary to separate the first duct 22 from the second duct 23 over a determined distance of the transport and heating device, so as to couple each of these ducts to an output of the pump. The ducts 22, 23 used according to this variant can be of circular section as represented in FIG. 2, or of optimized section as shown in FIG. 3 or 4.

Such a device also comprises at least one first heating element 24 and one second heating element 40, distinct from the first heating element but of similar structure. Each of these heating elements comprises a first strand 25 and a second strand 26 spaced apart from one another by the spacing means 31.

The transport and heating device 18 according to this third variant comprises a divisible area 41 of the wall 21 which extends between the first heating element 24 and the second heating element 40. In practice, such a divisible area is implemented by a thinned portion 42 of the wall 21, this thinned portion having a thickness measured in a direction parallel to the second straight line 30 of between 1 and 4 mm.

This divisible area 41 can be formed over the entire length of the transport and heating device 18 but it will be advantageous to form it only at the ends thereof. It is then possible to split the transport and heating device 18 into two parts, into a first pair formed by the wall 21 surrounding the first duct 22 and the first heating element 24 and into a second pair formed by the wall 21 surrounding the second duct 23 and the second heating element 40.

A divisible area as defined above is obviously also applicable to any of the variants illustrated and detailed in relation to FIGS. 2 to 4.

The invention claimed is:

1. A device for transporting and heating a liquid installed between a pump and a wiper brush constituting a wiping system of a vehicle window, the device comprising:
   a wall delimiting at least one liquid circulation duct;
   a heating element disposed within the wall, the heating element comprising at least one first electrically conductive strand and at least one second electrically conductive strand; and
   a spacing means disposed within the wall, the spacing means completely surrounding each of the at least one first electrically conductive strand and the at least one second electrically conductive strand and extending between the at least one first electrically conductive strand and the at least one second electrically conductive strand,
   wherein the spacing means is distinct from the wall and separates each of the at least one first electrically conductive strand and the at least one second electrically conductive strand from the wall,
   wherein the spacing means is disposed in an area within the wall that is outside of the at least one liquid circulation duct, and
   wherein the spacing means defines a determined distance between the at least one first and second electrically conductive strands in order to promote a dissipation of calories generated by the at least one first and second electrically conductive strands.

2. The device according to claim 1, wherein a first duct is provided that is separated from a second duct by the wall, the heating element extending between the first duct and the second duct.

3. The device according to claim 2, wherein the first duct and the second duct each have a duct centre through which passes a first straight line, and the at least one first electrically conductive strand and the at least one second electrically conductive strand each have a strand centre through which passes a second straight line, the second straight line being at right angles to the first straight line.

4. The device according to claim 2, wherein the first duct and the second duct each have a duct centre through which passes a first straight line, and the at least one first electrically conductive strand and the at least one second electrically conductive strand each have a strand centre through which passes a second straight line, the second straight line being parallel to the first straight line.

5. The device according to claim 4, wherein the second straight line is merged with the first straight line.

6. The device according to claim 1, wherein an internal face of the at least one liquid circulation duct comprises a first portion of a form different from a second portion of the internal face, the first portion being arranged to maximize a transfer of calories between the heating element and the liquid which can circulate in the at least one liquid circulation duct.

7. The device according to claim 6, wherein the first portion is rectilinear whereas the second portion is curved.

8. The device according to claim 7, wherein the rectilinear first portion extends along a third straight line parallel to a second straight line passing through a centre of the at least one first electrically conductive strand and a centre of the at least one second electrically conductive strand.

9. The device according to claim 6, wherein the first portion is curved in a convex manner whereas the second portion is curved in a concave manner.

10. The device according to claim 6, wherein the wall of the at least one liquid circulation duct which extends between one of the at least one first and second electrically conductive strands and the first portion of the internal face has a constant thickness.

11. The device according to claim 1, further comprising at least two ducts and an additional heating element comprising two strands spaced apart from one another by an additional spacing means, in which is provided a divisible area of the wall arranged between the heating element and the additional heating element.

12. The device according to claim 11, wherein the divisible area is formed by a thinned portion of the wall.

13. The device according to claim 1, wherein the spacing means is in contact with the at least one first electrically conductive strand and the at least one second electrically conductive strand.

14. The device according to claim 1, wherein the wall is a flexible tube and is made of a material selected from the group consisting of an ethylene propylene diene monomer (EPDM), an elastomer, and a rubber.

15. The device according to claim 1, wherein the spacing means is made of a flexible material.

16. The device according to claim 15, wherein the flexible material of the spacing means is selected from the group consisting of a silicone and a polytetrafluoroethylene (PTFE).

17. A system for supplying and distributing screen-wash liquid to be sprayed onto a window of a vehicle comprising:
at least one tank;
a pump;
a distributor for spraying the screen-wash liquid; and
one device for transporting and heating the liquid, the device for transporting and heating the liquid being installed between the pump and a wiper brush of a wiping system, the device for transporting and heating the liquid comprising:
a wall delimiting at least one liquid circulation duct;
a heating element disposed within the wall, the heating element comprising at least one first electrically conductive strand and at least one second electrically conductive strand; and
a spacing means disposed within the wall, the spacing means completely surrounding each of the at least one first electrically conductive strand and the at least one second electrically conductive strand and extending between the at least one first electrically conductive strand and the at least one second electrically conductive strand,
wherein the spacing means is distinct from the wall and separates each of the at least one first electrically conductive strand and the at least one second electrically conductive strand from the wall, and
wherein the spacing means is disposed in an area within the wall that is outside of the at least one liquid circulation duct.

\* \* \* \* \*